United States Patent [19]
Tagawa

[11] Patent Number: 5,882,815
[45] Date of Patent: Mar. 16, 1999

[54] SPIRAL ROLLED ELECTRODE ASSEMBLY HAVING A SERRATED CENTER PIN

[76] Inventor: Kazuo Tagawa, 397-3 Kuroda, Hannan-shi, Osaka-hu, 599-02, Japan

[21] Appl. No.: 829,208

[22] Filed: Mar. 31, 1997

[51] Int. Cl.$^6$ .................................................. H01M 6/10
[52] U.S. Cl. ........................... 429/94; 429/164; 429/208; 29/623.1
[58] Field of Search ................................ 429/66, 94, 169, 429/208; 29/623.1

[56] References Cited

U.S. PATENT DOCUMENTS

| | | | |
|---|---|---|---|
| 2,542,094 | 2/1951 | Richardson et al. | 429/164 X |
| 3,734,778 | 5/1973 | Huf et al. | 429/94 X |
| 4,237,199 | 12/1980 | Gelin | 429/94 |
| 4,565,753 | 1/1986 | Goebel et al. | 429/94 |
| 5,047,068 | 9/1991 | Stoklosa | 429/94 X |

*Primary Examiner*—Stephen Kalafut

[57] ABSTRACT

A spiral rolled non-aqueous electrochemical cell using a serrated segment on at least one end of the flash line of a hollow center pin disposed in the center of a spiral rolled electrode assembly so that when the cell is collapsed under external force, the serrated edge shorts the electrodes so that local high temperature can be prevented.

8 Claims, 1 Drawing Sheet

SPIRAL ROLLED ELECTRODE ASSEMBLY HAVING A SERRATED CENTER PIN

FIELD OF THE INVENTION

This invention is related to a non-aqueous electrolyte secondary cell. In more detail, this invention is related to a non-aqueous electrolyte secondary, which can prevent the abnormal local high temperature when the cell using a spiral electrode is collapsed under external force, and related to a method for preventing the gas blowout from the cell.

BACKGROUND OF THE INVENTION

Recently, the development on electronic machines progresses rapidly, and portable electronic instruments become smaller and smaller and at the same time lighter and lighter. Therefore, the cells used as the power source in these electronic instruments are also required to have low weight and high energy density. Non-aqueous electrolyte secondary cell using lithium-intercalated carbon material as the negative electrode and composite lithium-metal oxide, consisting of a transition metal, such as cobalt, nickel, manganese, etc., as well as lithium and oxygen, as the positive electrode has been widely used as the power source for various portable electronic instruments, such as video camera, notebook computer, cellular phone, etc., due to its high energy density as well as other excellent properties, including low weight and less self-discharge. As the power source for video camera and notebook computer, which need a relatively large current, a non-aqueous electrolyte secondary cell using a spiral structure for the electrodes has been proposed. In the secondary cell, the negative and positive electrodes are rolled together with the separator in between to form a spiral on the rolling core to achieve a large surface area for the electrodes, and after the rolling core is removed, a central space will remain in the spiral structure. This new non-aqueous electrolyte secondary cell can provide an energy density 20–60% higher than that obtained from the secondary cell with a traditional electrode structure. However, the new secondary cell will easily have decomposition and evaporation of the electrolyte, resulting in gas blowout, caused by local short and abnormal high temperature when the cell container is collapsed or lanced under external force. Especially, for the high-capacity non-aqueous electrolyte secondary cell using $LiCoO_2$ as the positive electrode material and graphite carbon, powder graphite, fiber graphite, etc., as the negative electrode material, under the overcharged conditions (4.3 V or higher), violent gas blowout may easily occur when the cell is collapsed under external force. A simple pipe-like center pin is insufficient to prevent the accident.

PROBLEMS TO BE SOLVED BY THE INVENTION

In consideration of the problem mentioned above, the purpose of this invention is to provide the new non-aqueous electrolyte secondary cell which will not have violent gas blowout when the cell is collapsed under external force and has a low weight and uses a center pin capable of being produced in a high efficiency.

SUMMARY OF THE INVENTION

The invention relates to an electrochemical cell having a spiral rolled electrode assembly with an opening defined at its center; a hollow center pin having a cut in the pin defined by spaced-apart flash lines and said center pin disposed in the opening of the spiral rolled electrode assembly; and wherein at least a segment of at least one flash line being serrated.

The invention also relates to a method for preventing the gas blowout from a non-aqueous cell, which can be used to prevent, when the cell container deforms, the gas blowout from the non-aqueous electrolyte secondary cell, which consists of a solid spiral located in the center part of the container and formed by rolling a negative electrode and a positive electrode with a separator in between and carrying a hollow cylinder like center pin in the central space of the solid spiral along the central axis in the cell's container, characterized by using a serrated part on the flash line of the center pin to lance through the negative electrode, positive electrode and separator to cause short in multiple places between the negative electrode and positive electrode when the cell container as well as the center pin deforms.

For the current non-aqueous electrolyte secondary cell using a simple pipe-like center pin, when the cell is collapsed under external force, local short occurs in the cell container, which can generate locally a large current as well as a high temperature, resulting in rapid decomposition and evaporation of the organic solvent used as the electrolyte liquid and generating a large amount of gases. For the non-aqueous electrolyte secondary cell of this invention, however, when the cell is collapsed under external force, short occurs on almost the whole electrode, so that the heat will be generated in the whole cell container. Consequently, the abnormal local high temperature and gas blowout can be avoided.

Preferably, in order to have the short to be spread on substantially the entire electrode when the cell is collapsed under external force, the center pin used in the cell should have a serrated part on at least one end of the flash line of the center pin, so that when the cell container as well as the center pin deforms, the serrated part on the flash line of the center pin can lance through the negative electrode, positive electrode, and separator to cause short in multiple places between the negative electrode and positive electrode. Therefore, in this invention, the center pin is required to have certain strength and shape. Moreover, in order to secure a short between the two electrodes, the center pin should have a high electric conductivity, preferably made from metals. When using a metal center pin, it should be resistant towards the electrolyte liquid. In consideration of high energy density, it is preferable to use a metal having a low specific gravity. Moreover, the material should also be selected so that the center pin can be produced in high efficiency.

The inventors carried out a series of studies to develop a center pin satisfying the above requirements. This invention has been based on the above studies. In this invention, as shown in FIGS. 1, 2 and 3, there is serrated part 2 on at least one end of the flash line 4 of cylinder-like center pin 1. When the cell container deforms, the center pin also deforms, so that the serrated part can lance through the electrodes and separator. The serrated part is located along the inner side of the central space of the solid spiral wrapped with the electrodes, so that the serrated part can lance through the electrodes and separator, when the cell container is collapsed under external force. Preferably, the flash line 4 can shift in the thickness direction. Moreover, as shown in FIG. 3, in the spiral structure, part 2 should have a shape not crossing over circumscribed circle 3 on the cross-section of the center pin. There is no special limitation on the shape for the serrated part, and in addition to triangle, other sharp shapes may also be used.

As the material for the center pin, in consideration of corrosion resistance and electric conductivity, the currently used stainless steel is very suitable. However, it is more preferable to use other materials, such as aluminum (including aluminum alloy), surface-oxidized aluminum, titanium, zirconium, etc., which can decrease the weight by 50% or more as compared to stainless steel. The center pin can be prepared from a slit plate with a thickness of 0.1–0.5 mm through punching press or multi-forming press to form the desired shape. Moreover, in order to further reduce the weight, a graphite fiber containing thermosetting resin can also be used.

The positive electrode material can be, for example, $LiCoO_2$, etc., containing mainly a transition metal, such as Mn, Ni, Fe, etc., as well as lithium and oxygen. The composite lithium metal oxide can absorb and desorb the lithium when the cell is charged and discharged. The negative electrode material can be, for example, petroleum pitch, mesophase pitch beads, etc. The carbon materials obtained through the thermal decomposition of polymers, such as poly p-phenylene, poly vinyl chloride, phenol resin polysiloxane, etc., as well as other carbon materials, such as synthetic graphite, natural graphite, fibrous graphite, etc., may also be used. The electrolyte liquid can be a non protonic organic solvent, such as ethylene carbonate, propylene carbonate, dimethyl carbonate, ethyl methyl carbonate, diethyl carbonate, diethoxyethane, methyl propionate, γ-butyrolacetone, etc. The electrolyte can be a lithium salt, such as $LiPF_6$, $LiBF_4$, $CF_3SO_3Li$, $(CF_3SO_3)_2NLi$, etc. These lithium salts can be used alone or as a mixture containing two or more of them.

Figure 1:
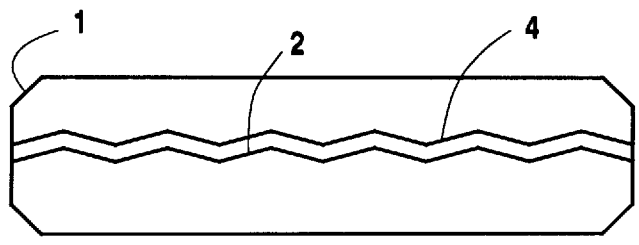
FIG. 1 is a plan view of the center pin for use in this invention.
Figure 1A:
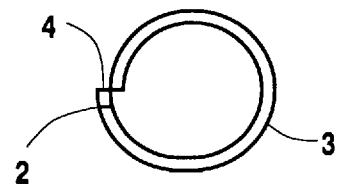
FIG. 1A is a side view of the center pin of FIG. 1.

Explanation of the symbols used:
1. Center pin
2. Serrated part
3. Circumscribed circle
4. Flash line

PRACTICAL EXAMPLES

In the following, this invention is explained in more detail with practical examples.

Practical Example 1

A positive electrode prepared by coating $LiCoO_2$ on aluminum foil followed by pressing and a negative electrode prepared by coating natural graphite on copper foil followed by pressing were rolled together separated by a membrane separator prepared by laminating porous polyethylene and polypropylene to form a spiral structure. The spiral electrode was then placed into a cell container with an external diameter of 18 mm and height of 65 mm (5-hour electric capacity of 1500 mAh) filled with the electrolyte liquid containing 1 mole of $LiPF_6$ in a solvent mixture of ethylene carbonate and ethyl methyl carbonate (volume ratio 1:3). Next, a duralmin center pin (external diameter: 4 mm, height: 55 mm, thickness: 0.4 mm) with the shape shown in FIG. 2 was inserted, and the cell was capped and sealed. Five cells with the same structure were prepared and then collapsed with a round bar. As shown in Table 1, no violent gas blowout was observed for these cells.

Practical Example 2

A positive electrode prepared by coating $LiCoO_2$ on aluminum foil followed by pressing and a negative electrode prepared by coating synthetic graphite on copper foil followed by pressing were rolled together separated by a membrane separator prepared by laminating porous polyethylene and polypropylene to form a spiral structure. The spiral electrode was then placed into a cell container with an external diameter of 18 mm and height of 65 mm (5-hour electric capacity of 1500 mAh) filled with the electrolyte liquid containing 1 mole of $LiPF_6$ in a solvent mixture of ethylene carbonate and ethyl methyl carbonate (volume ratio 1:3). Next, a surface-oxidized aluminum center pin (external diameter: 4 mm, height: 55 mm,) with the shape shown in FIG. 3 was inserted, and the cell was capped and sealed. Five cells with the same structure were prepared and then collapsed with a round bar. As shown in Table 1, no violent gas blowout was observed for these cells.

Practical Example 3

A positive electrode prepared by coating $LiCoO_2$ on aluminum foil followed by pressing and a negative electrode prepared by coating a carbon material obtained through the modification of petroleum pitch on copper foil followed by pressing were rolled together separated by a membrane separator prepared by laminating porous polyethylene and polypropylene to form a spiral structure. The spiral electrode was then placed into a cell container with an external diameter of 18 mm and height of 65 mm (5-hour electric capacity of 1400 mAh) filled with the electrolyte liquid containing 1 mole of $LiPF_4$ in a solvent mixture of ethylene carbonate, propylene carbonate and γ-butryrolacetone (volume ratio 1:1:2). Next, a titanium center pin (external diameter: 4 mm, height: 55 mm) with the shape shown in FIG. 1 was inserted, and the cell was capped and sealed. Five cells with the same structure were prepared and then collapsed with a round bar. As shown in Table 1, no violent gas blowout was observed for these cells.

Practical Example 4

A positive electrode prepared by coating $LiCoO_2$ on aluminum foil followed by pressing and a negative electrode prepared by coating a carbon material obtained through the modification of coal pitch on copper foil followed by pressing were rolled together separated by a membrane separator prepared by laminating porous polyethylene and polypropylene to form a spiral structure. The spiral electrode was then placed into a cell container with an external diameter of 18 mm and height of 65 mm (5-hour electric capacity of 1400 mAh) filled with the electrolyte liquid containing 1 mole of $LiPF_6$ in a solvent mixture of ethylene carbonate, ethyl methyl carbonate and dimethyl carbonate (volume ratio 1:2:1). Next, a zirconium center pin (external diameter: 4 mm, height: 55 mm) with the shape shown in FIG. 2 was inserted, and the cell was capped and sealed. Five cells with the same structure were prepared and then collapsed with a round bar. As shown in Table 1, no violent gas blowout was observed for these cells.

Example 5

A positive electrode prepared by coating $LiCoO_2$ on aluminum foil followed by pressing and a negative electrode prepared by coating petroleum coke on copper foil followed by pressing were rolled together separated by a membrane separator prepared by laminating porous polyethylene and polypropylene to form a spiral structure. The spiral electrode was then placed into a cell container with an external diameter of 18 mm and height of 65 mm (5-hour electric capacity of 1200 mAh) filled with the electrolyte liquid containing 1 mole of $LiPF_4$ in a solvent mixture of ethylene carbonate, propylene carbonate and γ-butyrolacetone (volume ratio 1:1:2). Next, a stainless steel center pin (external diameter: 4 mm, height: 55 mm) with the shape shown in FIG. 4 carrying no serrated part was inserted, and the cell was capped and sealed. Five cells with the same structure were prepared and then collapsed with a round bar. As shown in Table 1, violent gas blowout was observed for 3 cells.

TABLE 1

Test results when collapsed with a round bar

Figure 2:
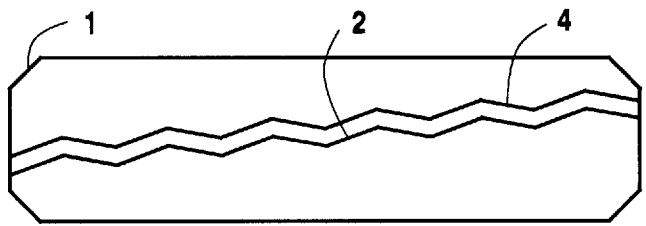
FIG. 2 is a plan view of another example of the center pin for use in this invention.
Figure 2A:
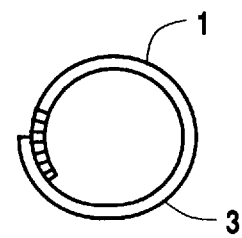
FIG. 2A is a side view of the center pin of FIG. 2.
Figure 3:
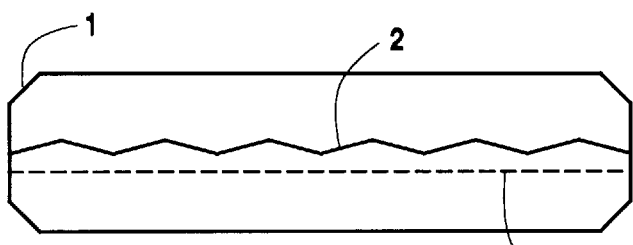
FIG. 3 is a plan view of another example of the center pin for use in this invention.
Figure 3A:
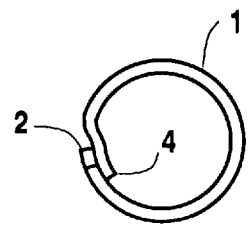
FIG. 3A is a side view of the center pin of FIG. 3.
Figure 4:
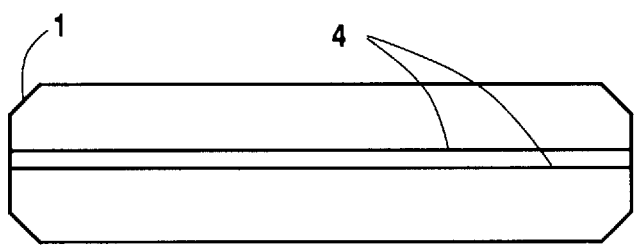
FIG. 4 is a plan view of the center pin used in current secondary cells.
Figure 4A:
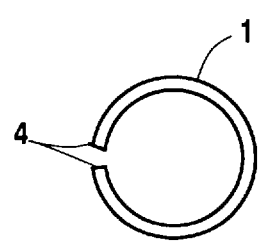
FIG. 4A is a side view of the center pin of FIG. 4.

| Test Number | Pin Shape | Pin Material | Pin Weight | Number of cells out of 5 having no gas blowout |
|---|---|---|---|---|
| 1 | Figure 2 | Duralmin | 0.6 g | 5 |
| 2 | Figure 3 | Aluminum | 0.6 g | 5 |
| 3 | Figure 1 | Titanium | 0.6 g | 5 |
| 4 | Figure 2 | Zirconium | 0.8 g | 5 |
| 5 | Figure 4 | Stainless Steel | 1.7 g | 2 |

EFFECT OF THE INVENTION

As described above, by using the method of this invention, the safety of the secondary cells can be improved when collapsed under external force, etc. Therefore, this invention is very useful in industry.

What is claimed:

1. An electrochemical cell having a spiral rolled electrode assembly with an opening defined at its center; a hollow center pin having a cut in the pin defined by spaced-apart flash lines and said center pin disposed in the opening of the spiral rolled electrode assembly and wherein at least a segment of at least one flash line is serrated.

2. The non-aqueous electrolyte secondary cell described in claim 1 whereby the cross-sectional shape perpendicular to the central pin is a circle.

3. The non-aqueous electrolyte secondary cell described in claim 1 characterized by that the center pin is made from a metal material selected from aluminum, surface-oxidized aluminum, zirconium, titanium and stainless steel.

4. The non-aqueous electrolyte secondary cell described in claim 2 characterized by that the center pin is made from a metal material selected from aluminum, surface-oxidized aluminum, zirconium, titanium and stainless steel.

5. A method for preventing the gas blowout from a non-aqueous cell, which consists of preparing a solid spiral electrode assembly formed by rolling a negative electrode and a positive electrode with a separator in between, preparing a hollow center pin with a cut in the pin defined by spaced-apart flash lines and serrating at least a segment of at least one flash line; and placing the spiral electrode assembly and hollow center pin in a cell container so when container and center pin is deformed, the serrated segment of the pin will lance through the negative electrode, positive electrode, a separator to cause short in multiple places between the negative electrode and positive electrode.

6. The method of claim 5 whereby the cross-sectional shape perpendicular to the central pin is a circle.

7. The non-aqueous electrolyte secondary cell described in claims 5 wherein the center pin is made from a metal material selected from aluminum, surface-oxidized aluminum, zirconium, titanium and stainless steel.

8. The non-aqueous electrolyte secondary cell described in claim 6 wherein the center pin is made from a metal material selected from aluminum, surface-oxidized aluminum, zirconium, titanium and stainless steel.

* * * * *